United States Patent [19]

Kawano

[11] Patent Number: 5,436,750
[45] Date of Patent: Jul. 25, 1995

[54] OPTICAL REPEATERED TRANSMISSION WITH FAULT LOCATING CAPABILITY

[75] Inventor: Toshibumi Kawano, Tokyo, Japan

[73] Assignee: NEC Corporation, Tokyo, Japan

[21] Appl. No.: 239,521

[22] Filed: May 9, 1994

[30] Foreign Application Priority Data

May 7, 1993 [JP] Japan .................. 5-106382

[51] Int. Cl.⁶ .................. H04B 10/02; H04B 10/00
[52] U.S. Cl. .................. 359/177; 359/110; 359/160; 359/179; 359/341; 372/6
[58] Field of Search ........ 359/110, 134, 160, 173–174, 359/177, 179, 341; 372/6; 375/3

[56] References Cited

U.S. PATENT DOCUMENTS

| | | | |
|---|---|---|---|
| 5,260,819 | 11/1993 | Hadjifotiou et al. | 359/160 |
| 5,268,786 | 12/1993 | Matsushita et al. | 359/177 |
| 5,299,048 | 3/1994 | Suyama | 359/160 |

FOREIGN PATENT DOCUMENTS

| | | | |
|---|---|---|---|
| 2242091 | 9/1991 | United Kingdom | 359/177 |
| 2245120 | 12/1991 | United Kingdom | 359/110 |

*Primary Examiner*—David K. Moore
*Assistant Examiner*—Kinfe-Michael Negash
*Attorney, Agent, or Firm*—Whitham, Curtis, Whitham & McGinn

[57] ABSTRACT

In an optical repeatered transmission system, an optical multiplex of a data signal and a supervisory signal is sent from a first terminal station. At an upstream repeater station, the optical signal is received and combined with excitation light energy supplied from a laser and amplified by an erbium-doped fiber with the excitation energy for transmission to a downstream repeater station. At the downstream repeater station, the optical signal is combined with excitation light energy supplied from a laser and amplified by an erbium-doped fiber with the excitation energy for transmission to a second terminal station. At the upstream repeater station, the supervisory signal is monitored. If it is determined to be lost, the excitation light energy of the station is modulated with a first fault-point indicating signal which is unique to the upstream repeater station and transmitted to the downstream repeater station instead of the optical multiplex signal. At the downstream repeater station, the supervisory signal and the first fault-point indicating signal are monitored. If both of these signals are determined to be lost, the excitation energy of the station is modulated with a second fault-point indicating signal that is unique to the downstream repeater station and transmitted to the second terminal station. If the supervisory signal and any of the fault-point indicating signals are not detected, an alarm is given indicating that a failure has occurred between the second terminal station and the downstream repeater station. If one of the fault-point indicating signals is detected, an alarm will be given indicating that a failure has occurred at a point identified by the detected fault-point indicating signal.

19 Claims, 4 Drawing Sheets

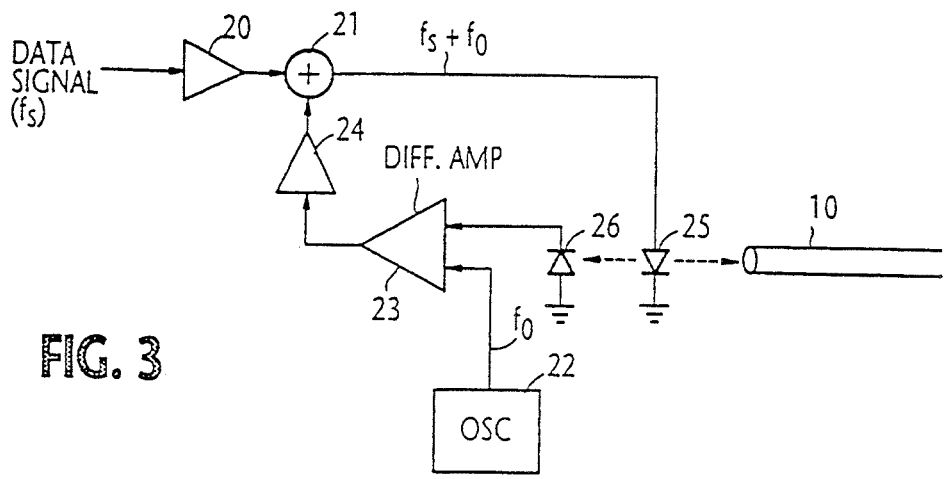
FIG. 3
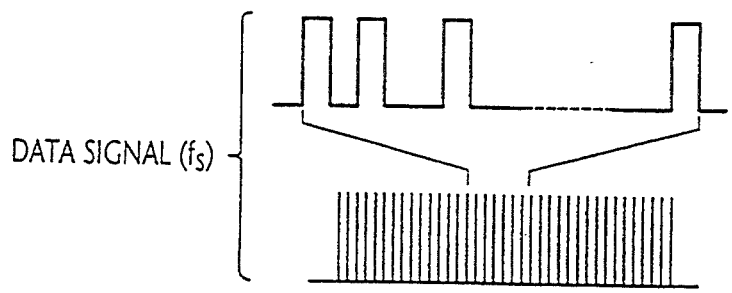
FIG. 4A  DATA SIGNAL ($f_s$)
FIG. 4B  SUPERVISORY SIGNAL ($f_0$)
FIG. 4C  $f_s + f_0$
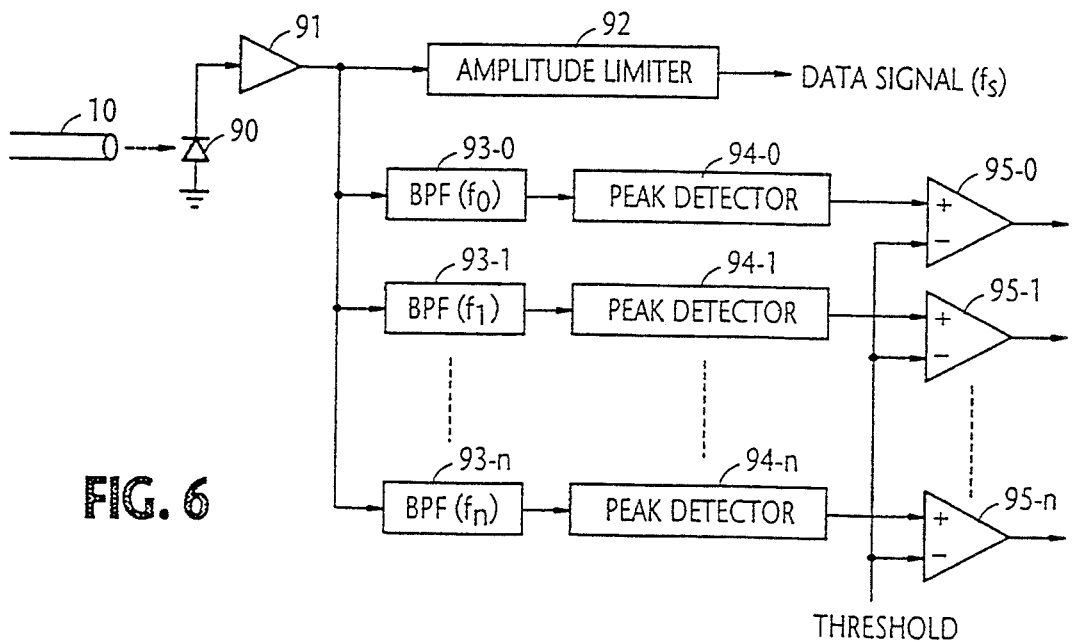
FIG. 6

OPTICAL REPEATERED TRANSMISSION WITH FAULT LOCATING CAPABILITY

BACKGROUND OF THE INVENTION

1. Field of the Invention

The present invention relates generally to an optical repeatered transmission systems, and more specifically to a fault location technique for optical repeaters and a transmission system employing such repeaters.

2. Description of the Related Art

In conventional optical repeatered transmission systems, a data signal is converted to an optical signal and transmitted to a first repeater station where the signal is converted to an electrical signal, amplified by an electronic amplifier and converted to an optical signal for transmission to a second repeater station, where the process is repeated for transmission to a distant terminal station. In conventional coaxial cable repeatered systems, on the other hand, a supervisory signal is multiplexed with a data signal and transmitted to repeater stations. At each repeater station the supervisory signal is constantly monitored. If a fault occurs in the incoming optical transmission channel of the first repeater station, the latter detects the absence of the supervisor, signal and sends out a fault-point indicating signal to the second repeater station, where it is relayed to the distant terminal station as an indication of the location of the fault.

In the optical transmission technique the general tendency is toward using an erbium-doped fiber excited by light energy supplied from an excitation laser in order to benefit from its ability to directly amplify optical signals. Because of the direct light amplification, however, the current electronic processing circuitry cannot be employed for optical repeatered transmission systems using erbium-doped fiber.

SUMMARY OF THE INVENTION

It is therefore an object of the present invention to provide an optical repeater and an optical repeatered transmission system using direct optical amplification capable of automatically locating a transmission channel failure.

According to a first aspect, the present invention provides an optical repeater for use in a transmission system which carries an optical signal which is a multiplex of a data signal and a supervisory signal. The optical repeater comprises an excitation laser for producing excitation light energy, an optical combined for receiving the optical signal through an incoming optical transmission channel and combining the received optical signal with the excitation light energy of the laser, and an erbium-doped fiber connected to the optical combiner for amplifying the combined optical signal with the combined excitation energy and transmitting the amplified signal through an outgoing optical transmission channel. A detector is provided for determining whether the supervisory signal is present or not in the amplified signal. The excitation light energy of the laser is modulated with a fault-point indicating signal if the supervisory signal is determined to be not present in the amplified signal so that the modulated energy is transmitted to a downstream station as an indication that a failure has occurred in the incoming transmission channel.

According to a second aspect, the present invention provides an optical repeater for use In a transmission system which carries an optical signal which is a multiplex of a data signal and a supervisory signal during normal system operation and which is first a fault-point indicating signal when a failure occurs in the system. The optical repeater comprises an excitation laser for producing excitation light energy, an optical combiner for receiving the optical signal through an incoming optical transmission channel and combining the received optical signal with the excitation kight energy of the laser, and an erbium-doped fiber connected to the optical combined for amplifying the received optical signal with the combined excitation energy and transmitting the amplified signal through an outgoing optical transmission channel. A detector is provided for determining whether the supervisory signal and the first fault-point indicating signal are present or not in the amplified signal. The excitation light energy of the laser is modulated with a second fault-point indicating signal if both the supervisory signal and the first fault-point indicating signal determined to not be present in the amplified signal so that the modulated energy is transmitted to a downstream station as an indication that a failure has occurred in the incoming transmission channel.

According to a third aspect, the present invention provides an optical repeatered transmission system comprising a first terminal station for optically multiplexing a digital signal with a supervisory signal to produce an optical signal which is relayed by one repeater station to a second terminal station. The repeater station Includes an optical combiner where the received signal is combined with excitation light energy from an excitation laser. An erbium-doped fiber is connected to the combined for amplifying the optical signal with the excitation energy and transmitting the amplified signal in a downstream direction of the system. The repeater station constantly monitors the supervisory signal. If the supervisory signal is lost, the repeater recognizes that a failure has occurred in the transmission channel and modulates the excitation energy of the laser fault-point indicating signal for transmission in the downstream direction. The second terminal station receives the optical multiplex signal during normal system operation and recovers the digital signal. Detectors are provided in the second terminal station for detecting the presence or absence of both of the supervisory and fault-point indicating signal to produce an alarm signal. If both the supervisory and fault-point indicating signal are not detected, the second terminal station will give an alarm indicating that a failure has occurred between it and the repeater station. If the fault-point indicating signal is detected, an alarm will be given indicating that a failure has occurred between the first terminal station and the repeater station.

According to a fourth aspect, the present invention provides an optical repeatered transmission system in which the optical signal is relayed to the second terminal station via at least two repeater stations, which are upstream and downstream repeater stations. At each repeater station, an optical combiner receives an optical signal transmitted downstream and combines it with excitation light energy supplied from an excitation laser and amplifies the signal with an erbium-doped fiber with the combined excitation energy and transmits the amplified signal downstream. At the upstream repeater station, the supervisory signal is monitored. If it is determined to be lost, the excitation light energy is modulated with a first fault-point indicating signal which is unique to the upstream repeater station and transmitted to the downstream repeater station. At the downstream repeater station, the supervisory signal and the first fault-point indicating signal are monitored. If both of the supervisory signal and the first fault-point indicating signal are determined to be lost, the excitation energy of the downstream station is modulated with a second fault-point indicating signal that is unique to the downstream station and transmitted to the second terminal station. If the supervisory signal and any of the first or second fault-point indicating signals are not detected, the second terminal station will give an alarm indicating that a failure has occurred between it and the downstream repeater station. If one of the first and second fault-point indicating signals is detected, an alarm will be given indicating that a failure has occurred at a point identified by the detected fault-point indicating signal.

BRIEF DESCRIPTION OF THE DRAWINGS

The present invention will be described in further detail with reference to the accompanying drawings, in which:

FIG. 3 is a circuit diagram of a laser driver circuit at an upstream terminal station of the system, which operates using an amplitude modulation technique for modulating excitation laser energy with the supervisory signal;

FIG. 4 is a waveform diagram illustrating the waveforms of the data signal and the supervisory signal and an amplitude modulated optical signal;

FIG. 6 is a block diagram of a downstream terminal station; and

DETAILED DESCRIPTION

Figure 1:
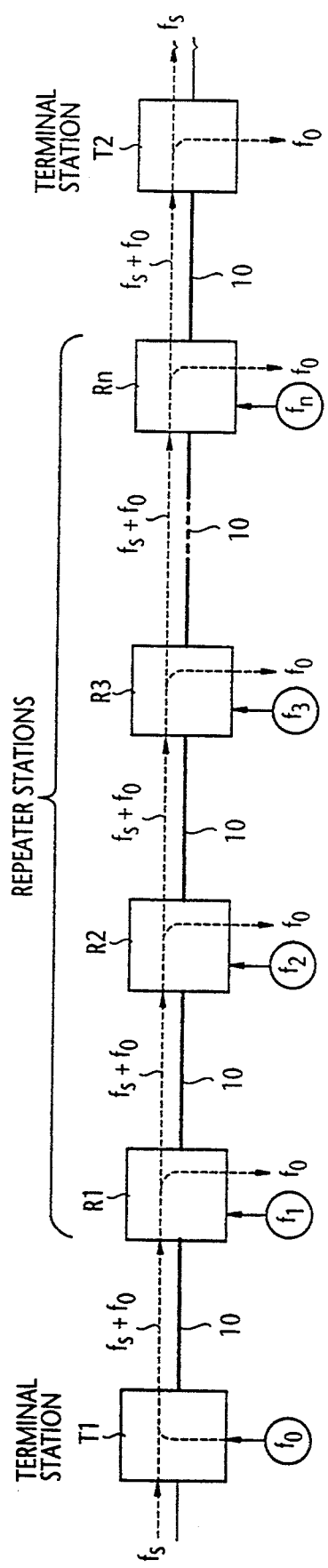
FIG. 1 is a schematic block diagram of an optical repeatered transmission system of the present invention, illustrating the flow of an optical signal which is a multiplex of a data signal and a supervisory signal transmitted from a terminal station.

A repeatered optical transmission system in which the present invention is embodied is illustrated in FIG. 1. The system illustrated in FIG. 1 utilizes erbium-doped optical fibers at repeater stations for amplifying a transmitted data signal and a supervisory signal, and in the event of a fault, allowing a fault-point indicating signal to be inserted into a downstream point of the fault for fault alarm indication to the downstream repeater stations. The system of FIG. 1 is an exemplary system in which two terminal stations T1 and T2 are illustrated and repeater stations R1 to Rn are connected between them by optical fiber cables 10. Terminal station T1 receives a data signal and a supervisory signal. These signals are multiplexed by an amplitude modulation technique. The multiplexer signal is converted to an optical signal and transmitted to repeater station R1 where it is amplified and relayed to the next repeater station. The same amplification and relaying operation is repeated at each successive repeater station until the signal is received by terminal station T2 where the signal is demultiplexed into the data signal and supervisory signal. At each repeater station, the multiplexed optical signal is filtered to check for the presence or absence of the supervisory signal. The presence of the supervisory signal indicates that there is no failure in the system. Each of the repeater stations R1–Rn includes an oscillator for generating a fault-point indicating signal of particular frequency which is uniquely assigned to the repeater station.

Figure 2:
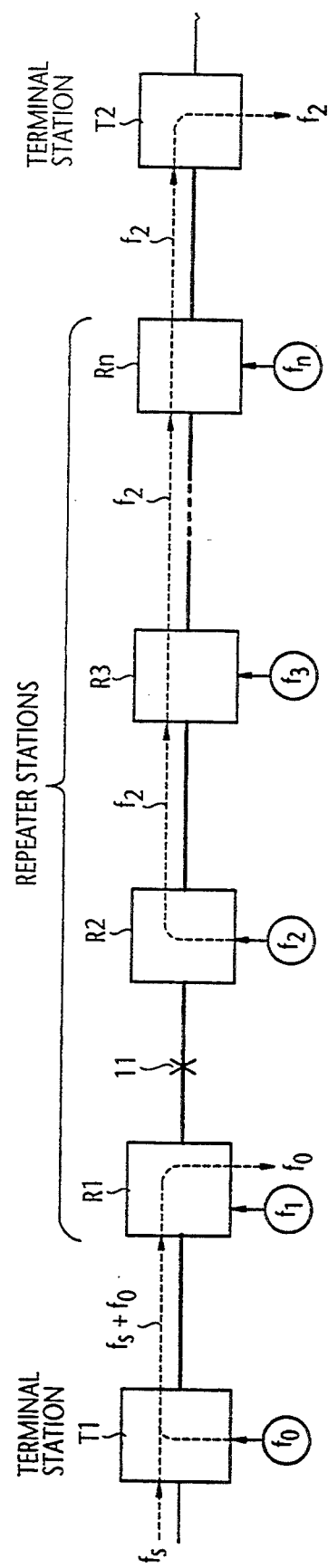
FIG. 2 is a schematic block diagram of the optical repeatered transmission system, illustrating the flows of the optical signal and a fault-point indicating signal when a cable failure occurs between repeater stations.

If a cable failure occurs between repeater stations R1 and R2 as marked 11 in FIG. 2, repeater station R2 determines that the supervisory signal is lost and transmits a fault-point indicating signal at frequency $f_2$ to the downstream repeater station R3 where it is amplified and relayed to the next station. The same process b repeated at successive stations so that the fault-point indicating signal $f_2$ is detected by terminal station T2 and the system operator is alerted. Because of the unique frequency $f_2$, the system operator recognizes that a cable fault has occurred between repeater stations R1 and R2.

Details of the system are shown in FIGS. 3 to 7. In FIG. 3, the terminal station T1 includes an amplifier 20 for amplifying the data signal which has been digitally encoded at frequency $f_S$. The output of amplifier 21 is coupled to an adder 21 where it is summed with an output of an amplifier 24 to produce a combined signal which is supplied to a laser diode 25. The optical output of laser diode 25 is coupled to the optical fiber 10. The intensity of the laser is monitored by a photodiode 26 which is coupled to one input of a differential amplifier 23. An oscillator 22 is provided for generating a constant amplitude sinusoidal signal at frequency $f_0$. This signal is applied as the supervisory signal to the other input of the differential amplifier where it is compared with the laser output to produce a difference signal. The output of the differential amplifier is amplified by amplifier 24 and fed back through adder 21 to the laser diode 25. In this manner, negative feedback operation is performed and the amplitude of the data signal is modulated with the supervisory signal at a modulation index of typically 10% as illustrated in FIG. 4. As is seen from FIG. 4, the frequency $f_0$ of the supervisory signal is much lower than the frequency $f_S$ or encoding rate of the data signal.

Figure 5:
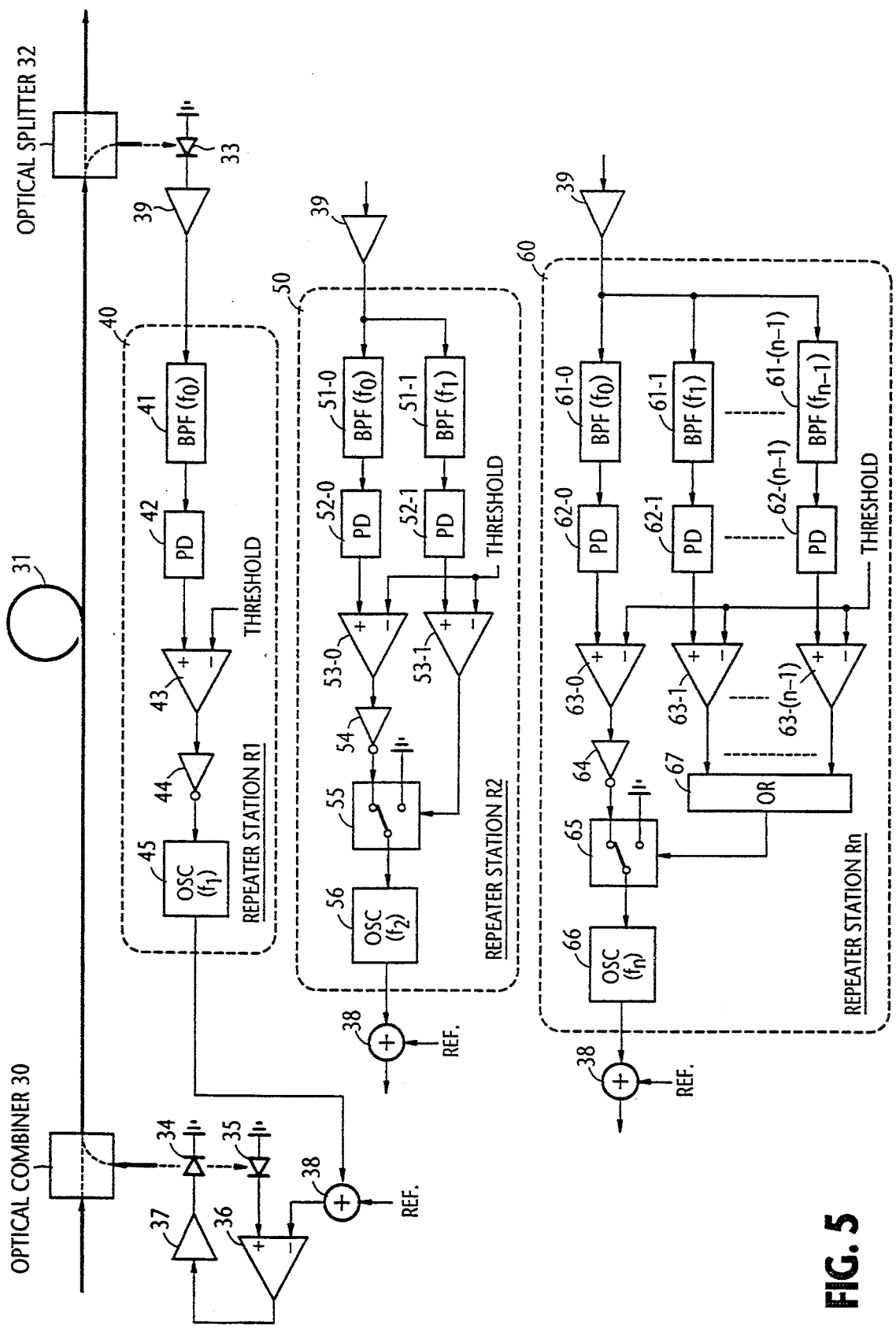
FIG. 5 is a block diagram of repeater stations according to one embodiment of the present invention.

As Illustrated in FIG. 5, each repeater station comprises an optical combiner, or wavelength division multiplexer 30 where an incoming optical multiplex signal is received through an incoming transmission channel and routed to an erbium-doped optical fiber loop 31 where the signal is directly amplified with excitation light energy of a laser in a known manner. Following the light amplification, the signal is applied to an optical splitter 32 where it is split into a first port for transmission to the next repeater station and a second port directed to a photodiode 33.

The excitation energy for the light amplification is generated by a laser diode 34 which is driven at a constant level during normal operation and modulated in the event of a failure that occurs in the incoming transmission channel. The optical output of the laser diode 34 is supplied to optical combiner 30 where It is combined with the incoming signal and injected to the erbium-doped fiber 31. A photodiode 35 is optically coupled to the laser diode 34 to sense its optical intensity for coupling to one input of a differential amplifier 36 whose output is connected through an amplifier 37 to the laser diode 34, The sensed laser intensity is compared with the output of an adder 38. On the other hand, the optical signal appearing at the second port of optical splitter 32 is converted to a corresponding electrical signal by the photodiode 33, and amplified by an amplifier 39.

Repeater station R1 includes a laser control circuit 40 which includes a bandpass filter 41 connected to the output of amplifier 39. Bandpass filter 41 has a passband which is centered at the frequency $f_0$ of the supervisory signal. The output of bandpass filter 41 is connected to a peak detector 42 whose output is applied to a comparator 43 for comparison with a predetermined threshold voltage. In the presence of the supervisory signal, the peak detector 42 will produce a DC output which exceeds the threshold voltage and comparator 43 produces a high level output which is inverted by an inverter 44, producing a disabling signal for an oscillator 45.

During normal system operation, the oscillator 45 is disabled and the differential amplifier 36 compares the laser output with the reference voltage only so that the laser diode 34 is driven at a constant level.

If the supervisory signal is lost due to a cable failure, comparator 43 will produce a low-level output, which is inverted by the inverter 44 to produce an enabling signal for oscillator 45. In response to the enabling signal, the oscillator 45 produces a sinewave signal of frequency $f_1$ that is uniquely assigned to repeater station R1. This sinewave signal is supplied to adder 38 where it is summed with a reference voltage so that the reference input of differential amplifier 36 is varied above and below the reference voltage and the excitation energy of laser diode 34 is amplitude modulated at frequency $f_1$ so that an amplitude-modulated optical signal is transmitted as a fault-point indicating signal to repeater station R2, instead of the multiplex signal $f_S + f_0$.

Repeater station R2 includes a control circuit 50 which includes bandpass filters 51-0 and 51-1 both of which are connected to the output of amplifier 39 of repeater station R2. Bandpass filters 51-0 and 51-1 have passbands centered at frequency $f_0$ and $f_1$, respectively, to detect the supervisory signal from the terminal station T1 and the fault-point indicating signal from repeater station R1. Peak detectors 52-0 and 52-1 are respectively coupled to the outputs of bandpass filters 51-0 and 51-1. The output of peak detector 52-0 is compared by comparator 53-0 with the threshold voltage to produce an output which is inverted by inverter 54 and coupled to the upper position of a switch 55. The output of switch 55 is supplied to an oscillator 56 which generates, in response to an enabling signal from switch 55, a sinewave signal at frequency $f_2$ which is uniquely assigned to repeater station R2. The output of peak detector 52-1 is compared by a comparator 53-1 with the threshold voltage to produce an output which is applied to the control terminal of switch 55. If the system is operating normally, the supervisory signal $f_0$ will be detected and comparator 53-0 produces a high-level output which is inverted by inverter 54, producing a disabling signal for the oscillator 56.

If a cable failure occurs between stations T1 and R1, the fault-point indicating signal $f_1$ from repeater station R1 will appear at the second port of splitter 32, and comparator 53-1 will produce a high level output, which causes switch 55 to change its contact from the upper position to the lower position which is grounded. Thus, a disabling signal is generated for the oscillator.

If a cable failure occurs between repeater stations R1 and R2, repeater station R2 receives no signal at all, with the result that the output of inverter 54 is high and the output of comparator 53-1 is low. Switch 55 remains in the upper contact position so that the high level output of inverter 54 is coupled to oscillator 56 as an enabling signal. The exaltation energy of laser diode 34 at repeater station R2 is therefore modulated at frequency $f_2$, and transmitted as a fault-point indicating signal $f_2$ from repeater station R2 to all downstream stations.

Likewise, repeater station Rn includes a control circuit 60 which includes bandpass filters 61-0, 61-1, . . . , 61-(n−1), all of which are connected to the output of amplifier 39 of repeater station Rn. Bandpass filters 61-0, 61-1, . . . , 61-(n−1) have passbands centered at frequency $f_0, f_1, \ldots, f_{n-1}$, respectively, to detect the supervisory signal from the terminal station T1 and the fault-point indicating signals any of the upstream repeater stations R1, R2, . . . , Rn−1. Peak detectors 62-0, 62-1, . . . , 62-n−1 are respectively coupled to the outputs of bandpass filters 61-0, 61-1, . . . , 61-(n−1). The output of peak detector 62-0 is compared by comparator 63-0 with the threshold voltage to produce an output which is inverted by inverter 64 and coupled to the upper position of a switch 65. The output of switch 65 is supplied to an oscillator 66 which generates, in response to an enabling signal from switch 65, a sinewave signal at frequency $f_n$ which is uniquely assigned to repeater station Rn. The outputs of peak detectors 62-1 to 62-(n−1) are compared by comparators 63-1 to 63-(n−1) with the threshold voltage to produce outputs which are applied to an OR gate 67 whose output is coupled to the control terminal of switch 65. If the system is operating normally, the supervisory signal $f_0$ will be detected and comparator 63-0 produces a high-level output which is inverted by inverter 64, producing a disabling signal for the oscillator 66.

If a cable failure occurs between stations T1 and Rn−1, the fault-point indicating signal $f_i$ (where $i = 1, 2, \ldots n-1$) from the repeater station Ri will appear at the second port of splitter 32 at repeater station Rn, and comparator 63-i will produce a high level output, which causes switch 65 to change its contact from the upper position to the grounded lower position, Thus, a disabling signal is generated for the oscillator 66.

If a cable failure occurs between repeater stations Rn−1 and Rn, repeater station Rn receives no signal at all. Thus, the output of inverter 64 is high and the output of comparator 63-1 is low. Switch 65 remains in the upper contact position, coupling the high level output of inverter 54 to oscillator 66 as an enabling signal. The excitation energy of laser diode 34 at repeater station Rn is therefore modulated at frequency $f_n$, and transmitted as a fault-point indicating signal $f_n$ to terminal station T2.

As shown in FIG. 6, the downstream terminal station T2 receives the signal from repeater station Rn using a photodetector 90. After being amplified at amplifier 91, the incoming signal is applied to an amplitude limiter 92 where the varying amplitude of the signal is rendered flat, eliminating the supervisory signal and recovering the data signal. To detect the supervisory signal and any of the fault-point indicating signals, the output of amplifier 91 is connected to a plurality of bandpass filters 93-0–93-n having passbands centered at frequencies $f_0$–$f_n$, respectively. The supervisory signal is detected by a peak detector 94-0 and a corresponding comparator 95-0. Fault-point indicating signals at frequencies $f_1$–$f_n$ are respectively detected by peak detectors 94-1–94-n and corresponding comparators 95-1–95-n. The outputs of comparators 95-0 through 95-n are applied to an alarm circuit, not shown, to give an appropriate warning signal if any of the fault-point indicating signals are detected. Therefore, if the supervisory signal and any of the fault-point indicating signals are not detected, the terminal station T2 will give an alarm indicating that a failure has occurred between it and the repeater station Rn. If a fault-point indicating signal is detected, an alarm will be given indicating that a failure has occurred at a point between repeater stations that can be identified by the fault-point indicating signal.

Figure 7:
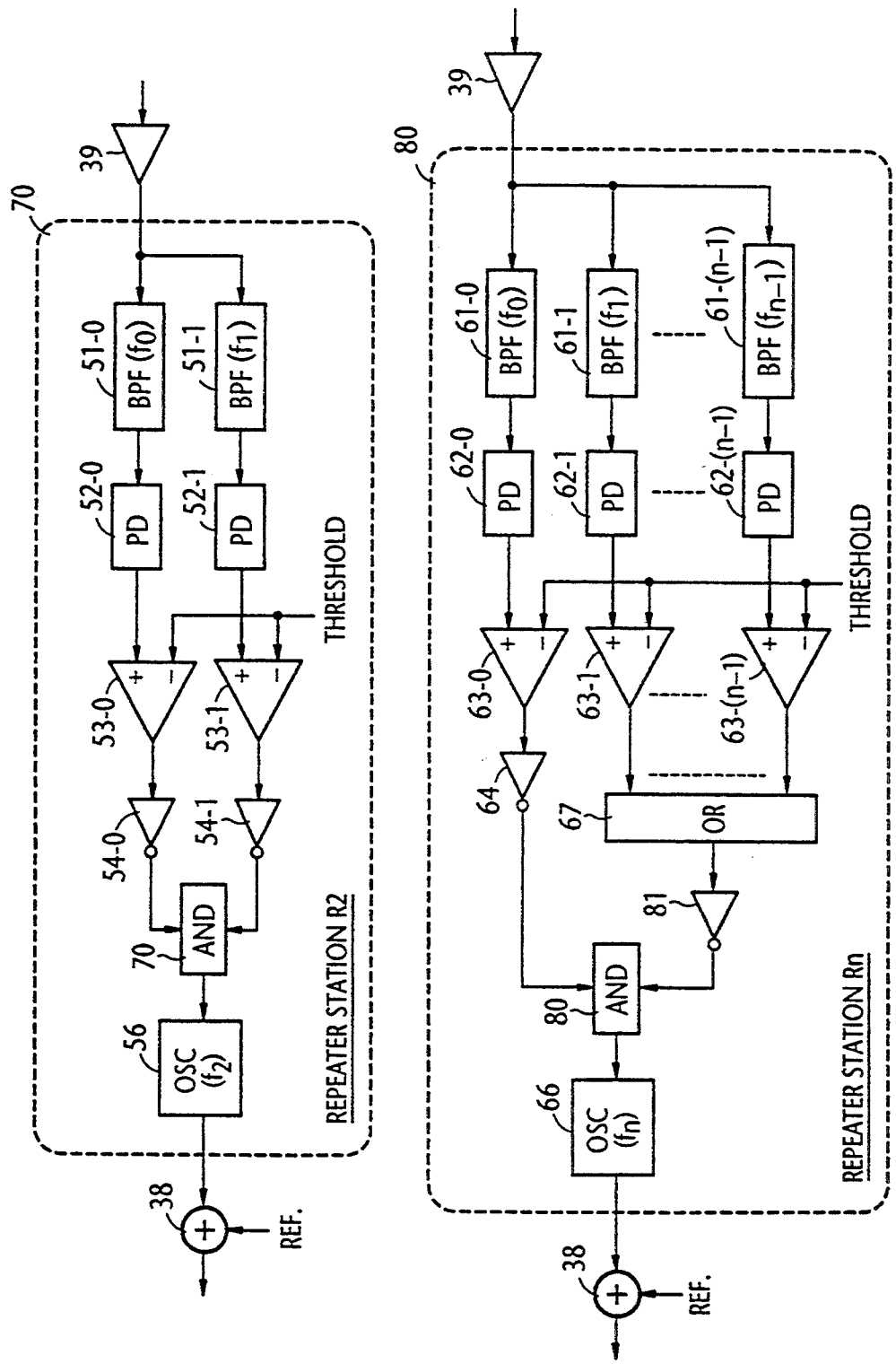
FIG. 7 is a block diagram of repeater stations according to a modified embodiment of the present invention.

The logic circuits of the repeater stations R2 to Rn of FIG. 5 are modified as shown in in FIG. 7, wherein parts corresponding to those in FIG. 5 are marked with the same numerals as used in FIG. 5. Repeater station R2 includes a control circuit 70 which differs from the control circuit 50 of FIG. 5 by the use of inverters 54-0 and 54-1 connected respectively to the outputs of comparators and an AND gate 70 connected to the outputs of the inverters, and the output of AND gate 70 is the input to the oscillator 56. Repeater station Rn includes a control circuit 80 which differs from the control circuit 60 of FIG. 5 by the use of an AND gate 80 and an inverter 81 which is connected to the output of OR gate 67. The outputs of inverters 64 and 81 are coupled to AND gate 80 whose output is the input to the oscillator 66. Inverter 81 produces a high level output when all comparators 63-1–63-(n−1) produce a low level output.

At repeater station R2, the absence of one of the supervisory signal and the fault-point indicating signal $f_1$ causes one of the outputs of inverters 54-0 and 54-1 to go high, causing AND gate 70 to produce a disabling signal for the oscillator 56, Simultaneous absence of these signals causes the AND gate to produce an enabling signal to transmit the fault-point indicating signal $f_2$ to downstream repeater stations. In the same manner, at repeater station Rn, AND gate 80 produces a .disabling signal in the absence of one of the supervisory signal and the fault-point indicating signal $f_i$ from an upstream repeater station Ri and produces an enabling signal in the simultaneous absence of these signals.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical repeater for use in a transmission system which carries an optical signal which is a multiplex of a data signal and a supervisory signal of constant frequency, comprising:
    an excitation laser for producing excitation light energy;
    an optical combiner for receiving said optical signal through an incoming optical transmission channel and combining the received optical signal with the excitation light energy of the laser;
    an erbium-doped fiber connected to the optical combiner for amplifying the combined optical signal with the excitation light energy and transmitting the amplified optical signal through an outgoing optical transmission channel;
    a photodetector connected to said erbium-doped fiber for converting the amplified signal to an electrical signal;
    a bandpass filter connected to the photodetector for detecting the presence of the supervisory signal in said electrical signal or the absence of the supervisory signal;
    a peak detector connected to said bandpass filter;
    a comparator for producing an output signal when an output signal of the peak detector is higher than a threshold value;
    signal generator means for generating a fault-point indicating signal in the absence of the output signal of said comparator; and
    modulator means connected to said signal generator means and said excitation laser for modulating the excitation light energy with said fault-point indicating signal.

2. An optical repeater as claimed in claim 1, wherein said signal generator means comprises an oscillator for generating a signal at a predetermined frequency.

3. An optical repeater as claimed in claim 1, wherein said modulator means comprises:
    a photodetector for detecting the excitation light energy of said excitation laser;
    an adder for summing said fault-point indicating signal and a reference voltage to produce a sum signal; and
    differential amplifier means for receiving the sum signal and an output of the photodetector to produce a difference signal and driving said excitation laser with the difference signal.

4. An optical repeater for use in a transmission system which carries an optical signal which is a multiplex of a data signal and a supervisory signal during normal system operation and a first fault-point indicating when a failure occurs in the system, comprising:
    an excitation laser for producing excitation light energy;
    an optical combiner for receiving said optical signal through an incoming optical transmission channel and combining the received optical signal with the excitation light energy of the laser;
    an erbium-doped fiber connected to the optical combiner for amplifying the received optical signal with the combined excitation energy and transmitting the amplified signal through an outgoing optical transmission channel;
    a photodetector connected to said erbium-doped fiber for converting the amplified signal to an electrical signal;
    first and second bandpass filters connected to the photodetector for respectively detecting the supervisory signal and the first fault-point indicating signal in said amplified signal;
    signal generator means connected to said first and second bandpass filters for generating a second fault-point indicating signal in the absence of output signals from said first and second bandpass filters; and
    modulator means connected to said signal generator means and said laser for modulating the excitation light energy with the second fault-point indicating signal.

5. An optical repeater as claimed in claim 4, wherein said signal generator means comprises an oscillator for generating a signal at a predetermined frequency.

6. An optical repeater as claimed in claim 4, wherein said detector means further comprises a first peak detector connected to said first bandpass filter, first comparator means for comparing a peak value detected by the first peak detector with a threshold value, a second peak detector connected to said second bandpass filter and second comparator means for comparing a peak value detected by the second peak detector with said threshold value.

7. An optical repeater as claimed in claim 4, wherein said modulator means comprises:
   a photodetector for detecting the excitation light energy from said excitation laser;
   an adder for summing said fault-point indicating signal and a reference voltage to produce a sum signal; and
   differential amplifier means for receiving the sum signal and an output of the photodetector to produce a difference signal and driving said excitation laser with the difference signal.

8. An optical repeatered transmission system comprising:
   a first terminal station including optical amplitude modulator means for optically modulating the amplitude of a digital signal with a supervisory signal to produce an optical signal and transmitting the optical signal through a first optical transmission channel, said supervisory signal being an analog signal at a frequency lower in comparison with a bit rate at which said digital signal is encoded;
   a repeater station comprising:
   an excitation laser for producing excitation light energy;
   an optical combiner for receiving the optical signal through said first optical transmission channel and combining the received signal with the excitation light energy of the laser;
   an erbium-doped fiber connected to the optical combiner for amplifying the combined optical signal with the combined excitation energy and transmitting the amplified signal through a second optical transmission channel;
   detector means connected to said erbium-doped fiber for detecting the presence of said supervisory signal or its absence in said amplified signal;
   signal generator means connected to the detector means for generating a fault-point indicating signal in the absence of said supervisory signal;
   modulator means connected to said signal generator means and said laser for modulating the excitation light energy with the fault-point indicating signal; and
   a second terminal station including means for receiving an optical signal through said second optical transmission channel, recovering the digital signal from the received optical signal, detecting the presence of said supervisory signal and said fault-point indicating signal in the received optical signal or their absence in the event of a transmission fault, and producing therefrom an alarm signal.

9. An optical repeatered transmission system as claimed in claim 8, wherein said amplitude modulator means at said first terminal station comprises:
   a laser diode optically coupled to said first optical transmission channel;
   a photodetector optically coupled to said laser diode;
   an oscillator for generating an output at the frequency of said analog signal;
   differential amplifier means having first and second inputs connected respectively to said photodetector and said oscillator, and
   an adder for summing said digital signal with an output signal of the differential amplifier means to produce a sum signal and driving said laser diode with the sum signal.

10. An optical repeatered transmission system as claimed in claim 8, wherein said detector means comprises a photodetector far converting the amplified signal to an electrical signal and a bandpass filter connected to the photodetector, the bandpass filter having a passband centered at the frequency of said analog signal for filtering the electrical signal therefrom.

11. An optical repeatered transmission system as claimed in claim 10, wherein said detector means further comprises a peak detector connected to said bandpass filter, and comparator means for producing said disabling signal when the peak detector output signal is higher than a significant level and producing said enabling signal when the peak detector output is lower than the significant level.

12. An optical repeatered transmission system as claimed in claim 8, wherein said signal generator means at said repeater station comprises an oscillator for generating a signal at a frequency assigned uniquely to the repeater station.

13. An optical repeatered transmission system as claimed in claim 8, wherein said modulator means at said repeater station comprises:
   a photodetector for detecting the exaltation light energy of said excitation laser;
   an adder for summing said fault-point indicating signal and a reference voltage to produce a sum signal; and
   differential amplifier means for receiving the sum signal and an output of the photodetector to produce a difference signal and driving said excitation laser with the difference signal.

14. An optical repeatered transmission system comprising:
   a first terminal station including optical amplitude modulator means for optically modulating the amplitude of a digital signal with a supervisory signal to produce an optical signal and transmitting the optical signal through a first optical transmission channel, said supervisory signal being an analog signal at a frequency lower in comparison with a bit rate at which said digital signal is encoded;
   an upstream repeater station connected to the first terminal station via the first optical transmission channel and a downstream repeater station connected to the upstream repeater station via a second optical transmission channel, the upstream repeater station comprising:
   a first excitation laser for producing excitation light energy;
   a first optical combiner for receiving an optical signal via said first optical transmission channel and combining the received signal with the excitation light energy of the laser;
   a first erbium-doped fiber connected to the first optical combiner for amplifying the combined optical signal with the excitation energy and transmitting the amplified signal via said second optical transmission channel;
   first detector means connected to the first erbium-doped fiber for detecting the presence of said supervisory signal or its absence in said amplified signal;

first signal generator means connected to the first detector means for generating a first fault-point indicating signal unique to the repeater station in the absence of said supervisory signal; and first modulator means connected to said first signal generator means and said first excitation laser for modulating the excitation light energy with the fault-point indicating signal, said downstream repeater station comprising:

a second excitation laser for producing excitation light energy;

a second optical combiner for receiving an optical signal via said second optical transmission channel and combining the received signal with the excitation light energy of the laser;

a second erbium-doped fiber connected to the second optical combiner for amplifying the combined optical signal with the excitation energy and transmitting the amplified signal via a third optical transmission channel;

second detector means connected to the erbium-doped fiber for detecting the presence of said supervisory signal and the first fault-point indicating signal or their absence in said amplified signal second signal generator means connected to the second detector means for generating a second fault-point indicating signal unique to the downstream repeater station in the absence of said supervisory signal and said first fault-point indicating signal;

second modulator means connected to said second signal generator means and said second excitation laser for modulating the excitation light energy with the second fault-point indicating signal;

a second terminal station including means for receiving an optical signal through said third optical transmission channel from said downstream repeater station, recovering the digital signal from the received optical signal, detecting the presence of said supervisory signal and first and second said fault-point indicating signals or their absence in the received optical signal, and producing therefrom an alarm signal.

15. An optical repeatered transmission system as claimed in claim 14, wherein said signal generator means at each of said repeater stations comprises an oscillator for generating a signal at a frequency assigned uniquely to the repeater station.

16. An optical repeatered transmission system as claimed in claim 14, wherein said supervisory signal is an analog signal at a frequency lower in comparison with a bit rate at which said digital signal is encoded, said first terminal station including optical amplitude modulator means for optically modulating the amplitude of the digital signal with said analog signal to produce said optical signal.

17. An optical repeatered transmission system as claimed in claim 14, wherein the amplitude modulator means at said first terminal station comprises:

a laser diode optically coupled to said first optical transmission channel;

a photodetector optically coupled to said laser diode;

an oscillator for generating a sinusoidal signal at the frequency of said analog signal;

differential amplifier means having first and second inputs connected respectively to said photodetector and said oscillator; and an adder for summing said digital signal with an output signal of the differential amplifier means to produce a sum signal and driving said laser diode with the sum signal.

18. An optical repeatered transmission system as claimed in claim 14, wherein said first detector means comprises a first photodetector for converting the signal amplified by the first erbium-doped fiber to an electrical signal and a first bandpass filter connected to the first photodetector, the first bandpass filter having a passband centered at the frequency of said analog signal for filtering the electrical signal therefrom, wherein said second detector means comprises a second photodetector for converting the signal amplified by the second erbium-doped fiber to an electrical signal, and second and third bandpass filters connected to the second photodetector, the second bandpass filter having a passband centered at the frequency of said analog signal for filtering the electrical signal therefrom, and the third bandpass filter having a passband centered at the frequency of the first fault-point indicating signal for filtering the electrical signal therefrom.

19. An optical repeatered transmission system as claimed in claim 18, wherein said first modulator means comprises:

a first photodetector for detecting the excitation light energy from said first excitation laser;

a first adder for summing said first fault-point indicating signal and a first reference voltage to produce a first sum signal; and first differential amplifier means for receiving the first sum signal and an output of the first photodetector to produce a first difference signal and driving said first excitation laser with the first difference signal, wherein said second modulator means comprises:

a second photodetector for detecting the excitation light energy from said second excitation laser;

a second adder for summing said second fault-point indication signal and a second reference voltage to produce a second sum signal; and second differential amplifier means for receiving the second sum signal and an output of the second photodetector to produce a second difference signal and driving said second excitation laser with the second difference signal.

* * * * *